United States Patent
Krishnamoorthy et al.

(10) Patent No.: US 12,236,261 B2
(45) Date of Patent: Feb. 25, 2025

(54) SYSTEM FOR DECENTRALIZED EDGE COMPUTING ENABLEMENT IN ROBOTIC PROCESS AUTOMATION

(71) Applicant: BANK OF AMERICA CORPORATION, Charlotte, NC (US)

(72) Inventors: Madhusudhanan Krishnamoorthy, Tamilnadu (IN); Aruna Jonna, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 922 days.

(21) Appl. No.: 17/177,436

(22) Filed: Feb. 17, 2021

(65) Prior Publication Data

US 2022/0258334 A1    Aug. 18, 2022

(51) Int. Cl.
*G06F 9/48*    (2006.01)
*G05B 13/02*    (2006.01)
(Continued)

(52) U.S. Cl.
CPC ........... *G06F 9/48* (2013.01); *G05B 13/0265* (2013.01); *G05B 13/048* (2013.01); *G06F 9/455* (2013.01); *G06F 9/45533* (2013.01); *G06F 9/45558* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5038* (2013.01);
(Continued)

(58) Field of Classification Search
CPC .. G06F 9/455; G06F 9/45533; G06F 9/45558; G06F 2009/45579; G06F 2009/45587; G06F 9/48; G06F 9/4843; G06F 9/4881; G06F 9/50; G06F 9/5005; G06F 9/5027; G06F 9/5038
See application file for complete search history.

(56) References Cited

U.S. PATENT DOCUMENTS

| | | |
|---|---|---|
| 10,535,207 B1 | 1/2020 | Goluguri et al. |
| 10,642,656 B2 | 5/2020 | Krishna Rao et al. |

(Continued)

OTHER PUBLICATIONS

Grover et al, Is Partial Quantum Search of a Database Any Easier, SPAA'05, Jul. 2005, ACMM, pp. 186-194 (Year: 2005).*

*Primary Examiner* — Charles M Swift
(74) *Attorney, Agent, or Firm* — Moore & Van Allen PLLC; Anup Iyer

(57) ABSTRACT

Systems, computer program products, and methods are described herein for decentralized edge computing enablement in robotic process automation. The present invention is configured to receive an indication that a hosted virtual desktop (HVD) has received a first set of instructions for execution from a controller hosted virtual desktop (CHVD); electronically receive, from the HVD, an indication that the first set of instructions have been executed by the HVD; predict, using the edge computing enablement engine, a second task to be executed by the HVD; determine, using the quantum database search algorithm, a location of the second task in the knowledge repository; retrieve a second set of instructions associated with the second task from the location of the second task in the knowledge repository; and receive, from the HVD, an indication that the second set of instructions have been executed by the HVD.

17 Claims, 3 Drawing Sheets

(51) Int. Cl.

| | |
|---|---|
| *G05B 13/04* | (2006.01) |
| *G06F 9/455* | (2018.01) |
| *G06F 9/50* | (2006.01) |
| *G06F 16/245* | (2019.01) |
| *G06N 5/02* | (2023.01) |
| *G06N 10/00* | (2022.01) |
| *B25J 9/16* | (2006.01) |

(52) U.S. Cl.
CPC ............ *G06F 16/245* (2019.01); *G06N 5/02* (2013.01); *G06N 10/00* (2019.01); *B25J 9/163* (2013.01); *G06F 2009/45579* (2013.01); *G06F 2009/45587* (2013.01)

(56) References Cited

U.S. PATENT DOCUMENTS

| | | |
|---|---|---|
| 10,726,642 B1 | 7/2020 | Goluguri et al. |
| 10,757,757 B2 | 8/2020 | Sabella et al. |
| 10,771,569 B1 | 9/2020 | Wang |
| 10,785,108 B1 | 9/2020 | Belton, Jr. |
| 10,827,033 B1 | 11/2020 | Balasubramanian et al. |
| 10,841,974 B1 | 11/2020 | Young et al. |
| 10,868,750 B1 | 12/2020 | Yang et al. |
| 10,896,555 B2 | 1/2021 | Goluguri et al. |
| 10,958,583 B2 | 3/2021 | Gatchalian et al. |
| 11,064,057 B2 | 7/2021 | Sabella et al. |
| 2016/0034362 A1* | 2/2016 | Al-Wahabi .......... G06F 11/0721 714/4.1 |
| 2018/0287869 A1 | 10/2018 | Munafo et al. |
| 2019/0045033 A1 | 2/2019 | Agerstam et al. |
| 2019/0158300 A1 | 5/2019 | Sabella et al. |
| 2020/0007414 A1 | 1/2020 | Smith et al. |
| 2020/0008044 A1 | 1/2020 | Poornachandran et al. |
| 2020/0074296 A1* | 3/2020 | Singh .................... G06N 3/044 |
| 2020/0076815 A1 | 3/2020 | Smith et al. |
| 2020/0178198 A1 | 6/2020 | Ding et al. |
| 2020/0195495 A1 | 6/2020 | Parker et al. |
| 2020/0229038 A1 | 7/2020 | Zhu et al. |
| 2020/0267518 A1 | 8/2020 | Sabella et al. |
| 2020/0314168 A1* | 10/2020 | Nauerz .................. H04L 67/02 |
| 2021/0299557 A1* | 9/2021 | Pare ...................... G06F 9/45558 |
| 2022/0131880 A1* | 4/2022 | Metz ..................... H04L 67/148 |
| 2022/0289537 A1* | 9/2022 | Davidson ............ B66F 9/07581 |

* cited by examiner

SYSTEM FOR DECENTRALIZED EDGE COMPUTING ENABLEMENT IN ROBOTIC PROCESS AUTOMATION

FIELD OF THE INVENTION

The present invention embraces a system for decentralized edge computing enablement in robotic process automation.

BACKGROUND

In Robotic Process Automation (RPA), a computer system or robot may mimic the actions of a human being in order to perform a computer-based task. In other words, RPA can be used to interact with application software (or application, for short) through its user interface, as a human being would do. In this way, RPA can be used to automate the execution of repetitive and manually intensive activities. In RPA frameworks with a centralized RPA server and multiple RPA bots, RPA servers coordinate the plurality of connected bots, allocate tasks to each bot, manage the execution of instructions for each task, and/or the like. There is an inherent dependency between each RPA bot and the RPA server. This dependency often times leads to a delay in communication between the RPA bot and the RPA server causing business critical operations to fail.

There is a need for a system to for decentralized edge computing enablement in robotic process automation.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for decentralized edge computing enablement in robotic process automation is presented. The system comprising: at least one non-transitory storage device; and at least one processing device coupled to the at least one non-transitory storage device, wherein the at least one processing device is configured to: electronically receive an indication that a hosted virtual desktop (HVD) has received a first set of instructions for execution from a controller hosted virtual desktop (CHVD), wherein the first set of instructions is associated with a first task; initiate an edge computing enablement engine on the HVD in response to receiving the indication that that HVD has received the first set of instructions; electronically receive, from the HVD, an indication that the first set of instructions have been executed by the HVD; predict, using the edge computing enablement engine, a second task to be executed by the HVD; initiate a quantum database search algorithm on a knowledge repository, wherein the knowledge repository comprises one or more tasks; determine, using the quantum database search algorithm, a location of the second task in the knowledge repository; retrieve a second set of instructions associated with the second task from the location of the second task in the knowledge repository; initiate, using the edge computing enablement engine, an execution of the second set of instructions on the HVD; and electronically receive, from the HVD, an indication that the second set of instructions have been executed by the HVD.

In some embodiments, the at least one processing device is further configured to: electronically receive, from the HVD, an indication that the first set of instructions were not successfully executed; determine at least one technical issue associated with the execution of the first set of instructions; initiate a machine learning model on the at least one technical issue; and classify the at least one technical issue into at least one class.

In some embodiments, the at least one processing device is further configured to: determine one or more actions associated with the at least one class; initiate, using the edge computing enablement engine, an execution of the one or more actions on the HVD; electronically receive, from the HVD, an indication that the one or more actions have been executed by the HVD; and electronically receive, from the HVD, an indication that the first set of instructions are successfully execute based on at least the execution of the one or more actions.

In some embodiments, the at least one processing device is further configured to: initiate the edge computing enablement engine on the HVD in response to receiving the indication that that HVD has received the first set of instructions, wherein initiating further comprises severing a communication link between the HVD and the CHVD.

In some embodiments, the at least one processing device is further configured to: electronically receive, from the HVD, the indication that the second set of instructions have been executed by the HVD; and re-establish the communication link between the HVD and the CHVD in response to receiving the indication that the second set of instructions have been executed by the HVD.

In some embodiments, the at least one processing device is further configured to: predict, using the edge computing enablement engine, the second task to be executed by the HVD, wherein predicting further comprises: initiating a sequence prediction algorithm on one or more past tasks executed by the HVD; training a sequence prediction model based on at least initiating the sequence prediction algorithm on the one or more past tasks; and predicting, using the sequence prediction model, the second task to be executed by the HVD.

In some embodiments, the at least one processing device is further configured to: initiate a quantum database search algorithm on a knowledge repository, wherein the quantum database search algorithm comprises at least a Grover's search algorithm.

In some embodiments, the at least one processing device is further configured to: electronically receive, from a computing device of a user, a request to establish a transmission link between the CHVD and the HVD; electronically receive, from the computing device of the user, one or more authentication credentials associated with the user; validate the one or more authentication credentials associated with the user; and establish the transmission link between the CHVD and the HVD.

In another aspect, a computer program product for decentralized edge computing enablement in robotic process automation is presented. The computer program product comprising a non-transitory computer-readable medium comprising code causing a first apparatus to: electronically receive an indication that a hosted virtual desktop (HVD) has received a first set of instructions for execution from a controller hosted virtual desktop (CHVD), wherein the first set of instructions is associated with a first task; initiate an edge computing enablement engine on the HVD in response to receiving the indication that that HVD has received the first set of instructions; electronically receive, from the HVD, an indication that the first set of instructions have been executed by the HVD; predict, using the edge computing enablement engine, a second task to be executed by the HVD; initiate a quantum database search algorithm on a knowledge repository, wherein the knowledge repository comprises one or more tasks; determine, using the quantum database search algorithm, a location of the second task in the knowledge repository; retrieve a second set of instructions associated with the second task from the location of the second task in the knowledge repository; initiate, using the edge computing enablement engine, an execution of the second set of instructions on the HVD; and electronically receive, from the HVD, an indication that the second set of instructions have been executed by the HVD.

In yet another aspect, a method for decentralized edge computing enablement in robotic process automation is presented. The method comprising: electronically receiving an indication that a hosted virtual desktop (HVD) has received a first set of instructions for execution from a controller hosted virtual desktop (CHVD), wherein the first set of instructions is associated with a first task; initiating an edge computing enablement engine on the HVD in response to receiving the indication that that HVD has received the first set of instructions; electronically receiving, from the HVD, an indication that the first set of instructions have been executed by the HVD; predicting, using the edge computing enablement engine, a second task to be executed by the HVD; initiating a quantum database search algorithm on a knowledge repository, wherein the knowledge repository comprises one or more tasks; determining, using the quantum database search algorithm, a location of the second task in the knowledge repository; retrieving a second set of instructions associated with the second task from the location of the second task in the knowledge repository; initiating, using the edge computing enablement engine, an execution of the second set of instructions on the HVD; and electronically receiving, from the HVD, an indication that the second set of instructions have been executed by the HVD.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
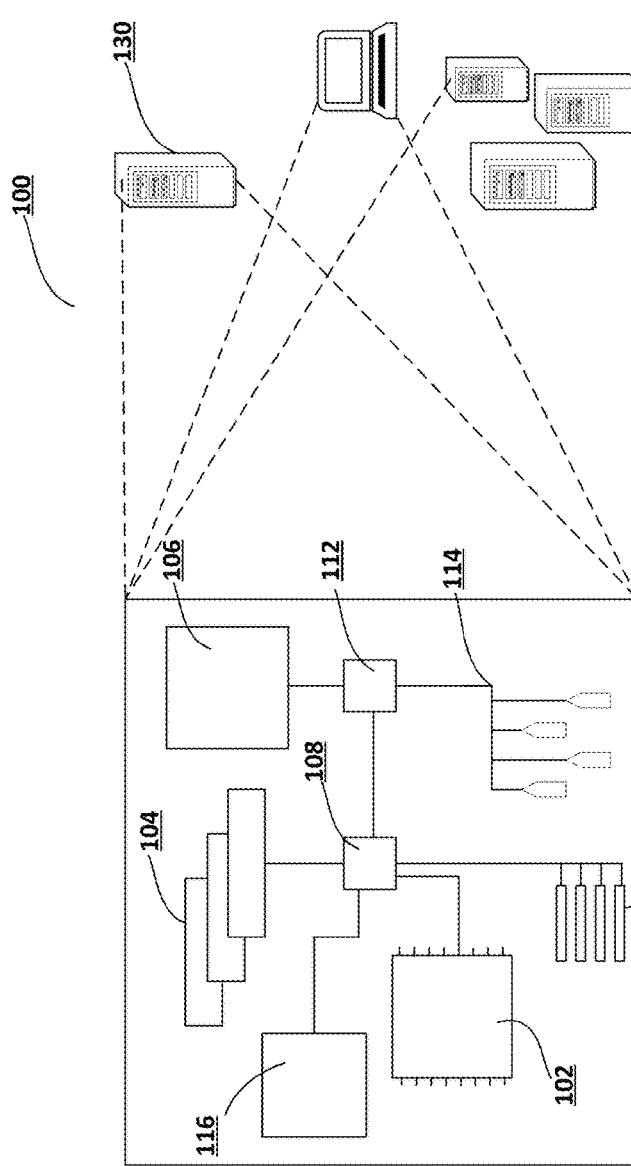
Figure 1:
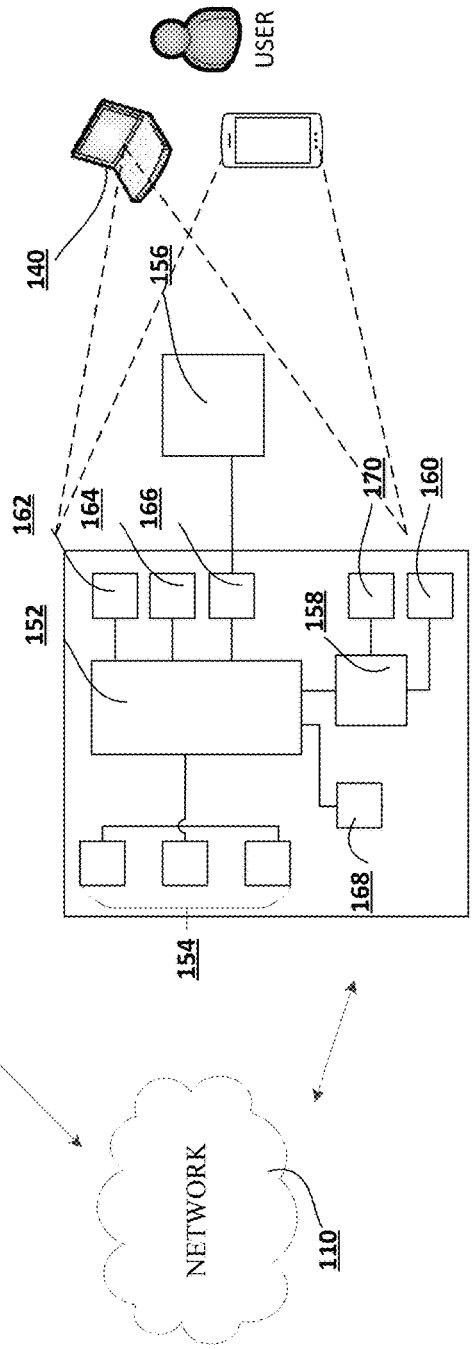
Figure 2:
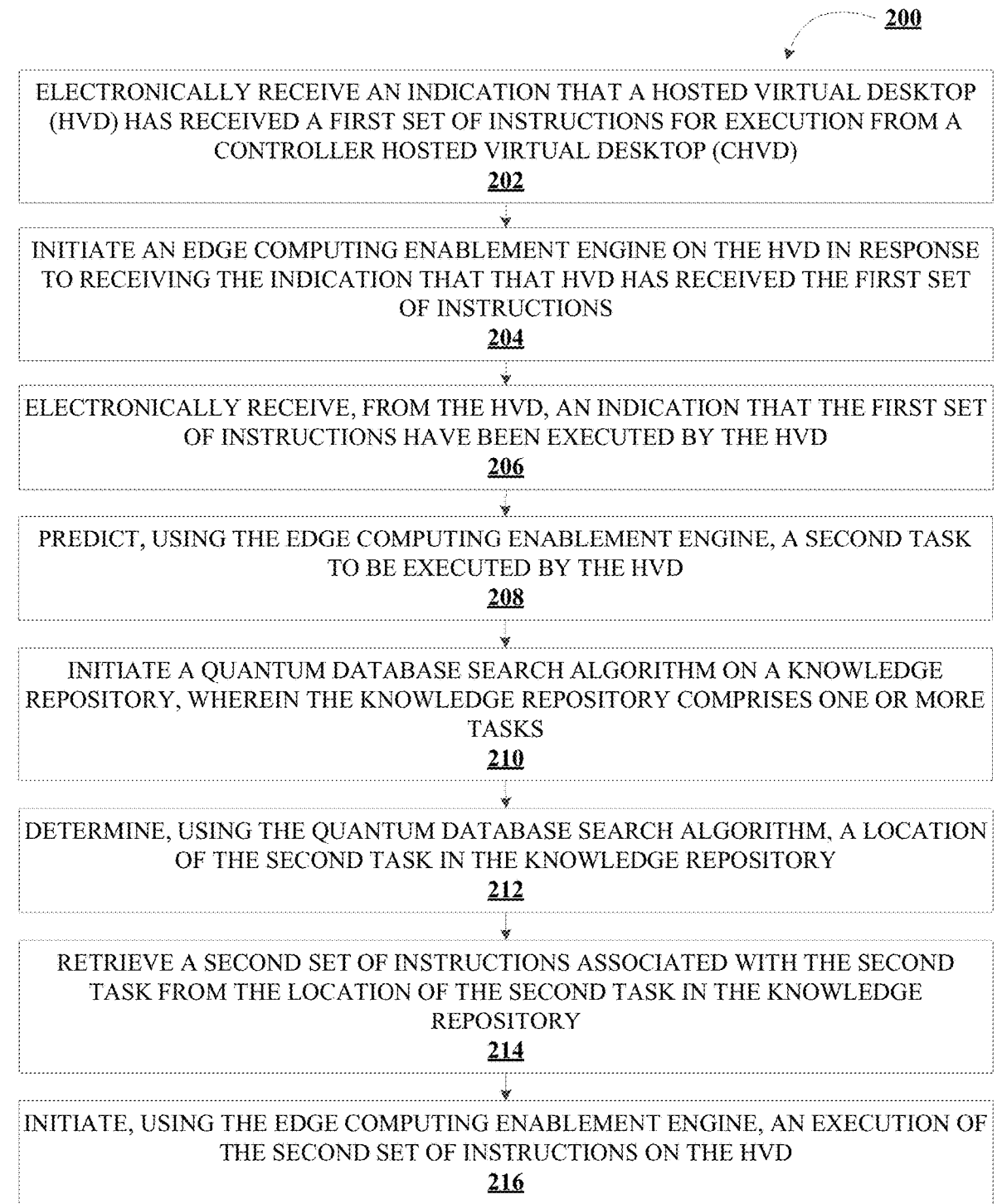
Figure 3:
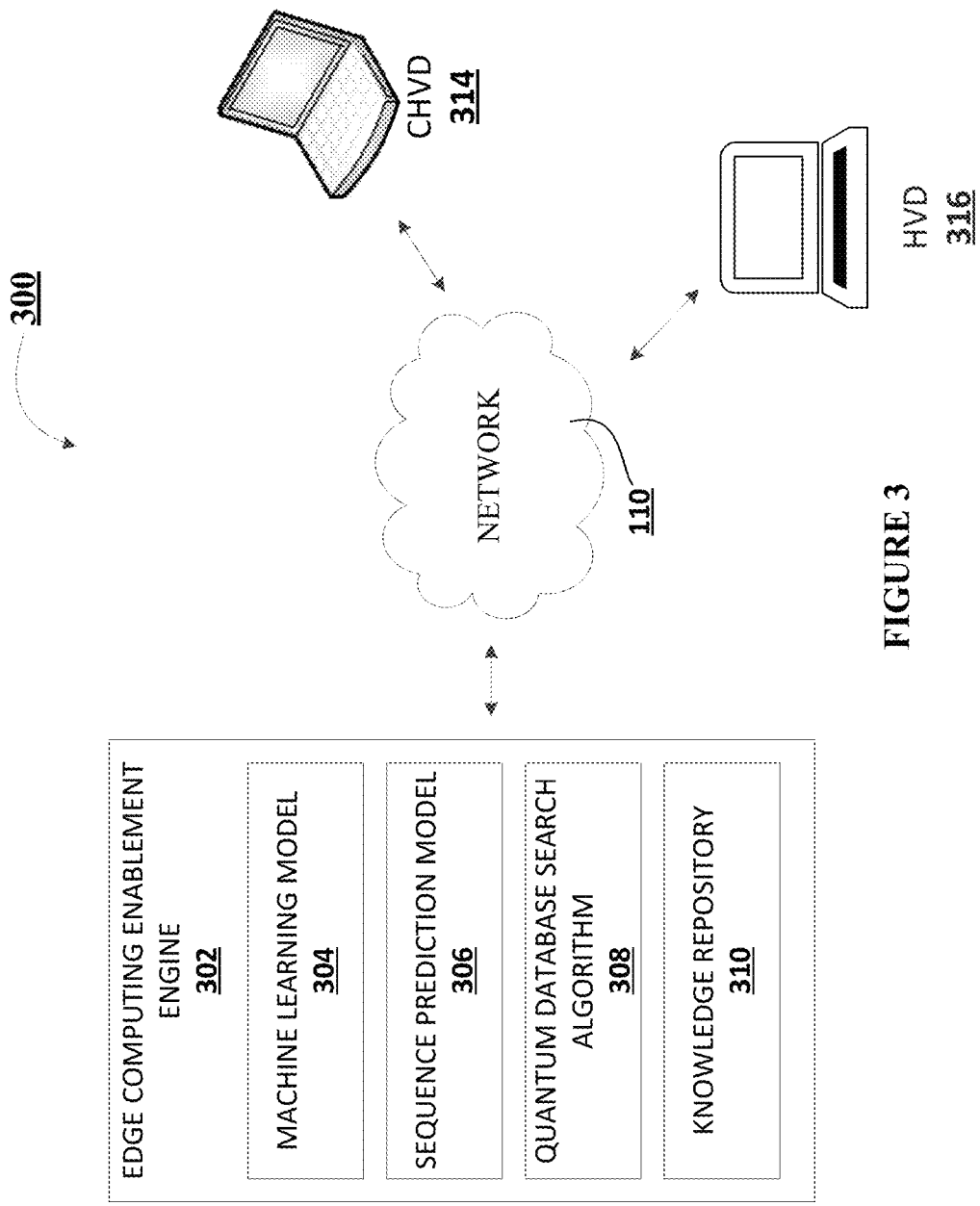

Having thus described embodiments of the invention in general terms, reference will now be made the accompanying drawings, wherein:

FIG. 1 illustrates technical components of a system for decentralized edge computing enablement in robotic process automation, in accordance with an embodiment of the invention;

FIG. 2 illustrates a process flow for decentralized edge computing enablement in robotic process automation, in accordance with an embodiment of the invention; and FIG. 3 illustrates a data flow diagram for decentralized edge computing enablement in robotic process automation, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within the system described herein. In doing so, the engine may be configured to execute source code embedded therein to control specific features of the system to execute specific computing operations.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), sequence prediction algorithms (e.g., using artificial recurrent neural networks such as long short-term memory, gated recurrent unit, time series algorithms, highway networks, long-term potentiation) and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

In Robotic Process Automation (RPA), a computer system or robot may mimic the actions of a human being in order to perform a computer-based task. In other words, RPA can be used to interact with application software (or application, for short) through its user interface, as a human being would do. Therefore, it is not necessary to integrate RPA with the existing applications at a programming level, thereby eliminating the difficulties inherent to integration, namely bringing together diverse components. In this way, RPA can be used to automate the execution of repetitive and manually intensive activities. RPA's potential benefits are manifold. They can include reducing costs (by cutting staff), lowering error rates, improving service, reducing turnaround time, increasing the scalability of operations, and improving compliance.

In embodiments contemplated herein, an RPA framework includes a controller hosted virtual desktop (CHVD) operatively coupled to a plurality of hosted virtual desktops (HVD). A CHVD may be configured to coordinate the plurality of connected HVDs, allocate tasks to each HVD, manage the execution of instructions for each task, register the successful execution of each allocated task, and/or generate reports associated with the execution of the tasks. An HVD may be programmed by the CHVD to learn, mimic, and execute tasks allocated by the CHVD. While each HVD is configured to execute a set of instructions for each task independently, resolution of any issue encountered by the HVD during the execution of a task or determination of the next task in the sequence requires communication with the CHVD to retrieve instructions. Often times execution of business critical tasks cannot afford the delay in communication between each HVD and CHVD. There is a need for a system to for decentralized edge computing enablement in robotic process automation.

FIG. 1 presents an exemplary block diagram of the system environment for decentralized edge computing enablement in robotic process automation 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for decentralized edge computing enablement in robotic process automation 200, in accordance with an embodiment of an invention. As described herein, an embodiment of the RPA framework contemplated herein may include a controller hosted virtual desktop (CHVD) operatively coupled to a plurality of hosted virtual desktops (HVD). In this regard, the system may be configured to electronically receive, from a computing device of a user, a request to establish a transmission link between the CHVD and the HVD. In response, the system may be configured to electronically receive, from the computing device of the user, one or more authentication credentials associated with the user. In response, the system may be configured to validate the one or more authentication credentials associated with the user. In response to validating the one or more authentication credentials, the system may be configured to establish the transmission link between the CHVD and the HVD.

As shown in block 202, the process flow includes electronically receiving an indication that a hosted virtual desktop (HVD) has received a first set of instructions for execution from a controller hosted virtual desktop (CHVD). In some embodiments, the first set of instructions may be received by the HVD from the CHVD via the transmission link. In some embodiments, the first set of instructions is associated with a first task. In some embodiments, a task may be high volume, repeatable, rule-based objective that previously required a user to perform but are now capable of being automated using RPA. The execution of a task may be defined by a set of instructions specific to the task. These instructions are pre-defined by the user.

Next, as shown in block 204, the process flow includes initiating an edge computing enablement engine on the HVD in response to receiving the indication that that HVD has received the first set of instructions. In some embodiments, in response to receiving the indication that the HVD has received the first set of instructions, the system may be configured to sever a communication link between the HVD and the CHVD. In this way, once the instructions to execute the task are received by the HVD from the CHVD, the system may be configured to sever the dependency of the HVD on the CHVD and use the edge computing enablement engine to manage the execution of the task.

Next, as shown in block 206, the process flow includes electronically receiving, from the HVD, an indication that the first set of instructions have been executed by the HVD. In this regard, the system may be configured to determine that each instruction has been executed successfully in the prescribed sequence without any exceptions. In some embodiments, each HVD may be required to execute a collection of tasks in a predetermined sequence, with each task having its own set of instructions. Typically, when the HVD completes the execution of a task, it has to communicate the completion of the task to the CHVD, which then transmits the next task and the associated set of instructions to the HVD. Here, the edge computing enablement engine, having severed the communication between the HVD and the CHVD, manages the allocation of the next task.

In some embodiments, the system may be configured to electronically receive, from the HVD, an indication that the first set of instructions were not successfully executed. In response, the system may be configured to determine at least one technical issue associated with the execution of the first set of instructions. In some embodiments, a technical issue may be an unsuccessful execution of a specific instruction, one or more exceptions received in response to a successful execution of an instruction, authentication issues associated with the execution of an instruction, and/or the like. In response, the system may be configured to initiate a machine learning model on the at least one technical issue. In response, the system may be configured to classify the at least one technical issue into at least one class. By classifying each technical issue into a class, the system may be configured to categorize the technical issue.

Based on the category, the system may then be configured to identify a solution to fix the technical issue. Accordingly, in some embodiments, the system may be configured to determine one or more actions associated with the at least one class. Each action may be a remedial response associated with the category in which the technical issue was classified into. In response, the system may be configured to initiate, using the edge computing enablement engine, an execution of the one or more actions on the HVD. By executing the remedial response actions on the HVD, the system may be configured to address the technical issue encountered by the HVD. Successful execution of the actions indicate that the technical issue has been resolved. In response, the system may be configured to electronically receive, from the HVD, an indication that the one or more actions have been executed by the HVD. Now that the technical issue has been resolved based on the execution of the remedial action, the system may be configured to transmit control signals configured to cause the HVD to continue execution of the first set of instructions. In response, the system may be configured to electronically receive, from the HVD, an indication that the first set of instructions are successfully executed based on at least the execution of the one or more actions.

Next, as shown in block 208, the process flow includes predicting, using the edge computing enablement engine, a second task to be executed by the HVD. In this regard, the system may be configured to initiate a sequence prediction algorithm on one or more past tasks executed by the HVD. In some embodiments, given a specific set of sequential inputs, the sequence prediction algorithm may be configured to predict the next entry in the sequence. Here, having successfully executed the first task, the edge computing enablement engine may be configured to determine the second task in the sequence for the HVD. In this regard, the system may be configured to train a prediction model based on at least initiating the sequence prediction algorithm on the one or more past tasks. In some embodiments, these past tasks are tasks previously executed by the HVD in response to instructions received from the CHVD (and/or the user). By use these past tasks as training data, the edge computing enablement engine may be configured to train the prediction model using the sequence prediction algorithm. In response, the system may be configured to predict, using the prediction model, the second task to be executed by the HVD. Once the second task is completed, the prediction model is used again to predict the third task to be executed by the HVD, and so on.

Next, as shown in block 210, the process flow includes initiating a quantum database search algorithm on a knowledge repository, wherein the knowledge repository comprises one or more tasks. In some embodiments, a quantum database search algorithm may run on a realistic model of quantum computation (e.g., quantum circuit model) and uses an essential feature of quantum computation such as quantum superposition or quantum entanglement. For purposes of the invention, the quantum database search algorithm may be Grover's search algorithm for searching an unstructured database (such as the knowledge repository) or an unordered list. Grover's algorithm is a quantum algorithm that finds with high probability the unique input to a black box function that produces a particular output value, using just $O(\sqrt{N})$ evaluations of the function, where N is the size of the function's domain.

Next, as shown in block 212, the process flow includes determining, using the quantum database search algorithm, a location of the second task in the knowledge repository. In some embodiments, the location of the second task in the knowledge repository may include one or more instructions for the execution of the second task. Next, as shown in block 214, the process flow includes retrieving a second set of instructions associated with the second task from the location of the second task in the knowledge repository.

Next, as shown in block 216, the process flow includes initiating, using the edge computing enablement engine, an execution of the second set of instructions on the HVD. In some embodiments, the system may be configured to electronically receive, from the HVD, an indication that the second set of instructions have been executed by the HVD. In embodiments where the second task is the final task to be executed by the HVD, the system may be configured to re-establish the communication link between the HVD and the CHVD in response to receiving the indication that the second set of instructions have been executed by the HVD.

FIG. 3 illustrates a data flow diagram for decentralized edge computing enablement in robotic process automation 300, in accordance with an embodiment of the invention. As shown in FIG. 3, the data flow diagram includes an edge computing enablement engine 302, a CHVD 314, and an HVD 316 operatively connected to each other via the network 110. As described herein, the edge computing enablement engine 302 may be configurable to be implemented within the system 130 described herein. In some embodiments, the edge computing enablement engine 302 may include a machine learning model 304, a sequence prediction model 304, a quantum database search algorithm 308, and a knowledge repository 310.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for decentralized edge computing enablement in robotic process automation, the system comprising:
   at least one non-transitory storage device; and
   at least one processing device coupled to the at least one non-transitory storage device, wherein the at least one processing device is configured to:

electronically receive an indication that a hosted virtual desktop (HVD) has received a first set of instructions for execution from a controller hosted virtual desktop (CHVD), wherein the first set of instructions is associated with a first task;

initiate an edge computing enablement engine on the HVD in response to receiving the indication that that HVD has received the first set of instructions, wherein initiating further comprises severing a communication link between the HVD and the CHVD to remove a dependency of the HVD on the CHVD and use the edge computing enablement engine to manage the execution of the task;

electronically receive, from the HVD, an indication that the first set of instructions have been executed by the HVD;

predict, using the edge computing enablement engine, a second task to be executed by the HVD;

initiate a quantum database search algorithm on a knowledge repository, wherein the knowledge repository comprises one or more tasks;

determine, using the quantum database search algorithm, a location of the second task in the knowledge repository;

retrieve a second set of instructions associated with the second task from the location of the second task in the knowledge repository;

initiate, using the edge computing enablement engine, an execution of the second set of instructions on the HVD;

electronically receive, from the HVD, an indication that the second set of instructions have been executed by the HVD; and in an instance in which the second task is a final task to be executed by the HVD, re-establish the communication link between the HVD and the CHVD in response to receiving the indication that the second set of instructions have been executed by the HVD.

2. The system of claim 1, wherein the at least one processing device is further configured to:

electronically receive, from the HVD, an indication that the first set of instructions were not successfully executed;

determine at least one technical issue associated with the execution of the first set of instructions;

initiate a machine learning model on the at least one technical issue; and classify the at least one technical issue into at least one class.

3. The system of claim 2, wherein the at least one processing device is further configured to:

determine one or more actions associated with the at least one class;

initiate, using the edge computing enablement engine, an execution of the one or more actions on the HVD;

electronically receive, from the HVD, an indication that the one or more actions have been executed by the HVD; and electronically receive, from the HVD, an indication that the first set of instructions are successfully execute based on at least the execution of the one or more actions.

4. The system of claim 1, wherein the at least one processing device is further configured to:

predict, using the edge computing enablement engine, the second task to be executed by the HVD, wherein predicting further comprises:

initiating a sequence prediction algorithm on one or more past tasks executed by the HVD;

training a sequence prediction model based on at least initiating the sequence prediction algorithm on the one or more past tasks; and predicting, using the sequence prediction model, the second task to be executed by the HVD.

5. The system of claim 1, wherein the at least one processing device is further configured to:

initiate a quantum database search algorithm on a knowledge repository, wherein the quantum database search algorithm comprises at least a Grover's search algorithm.

6. The system of claim 1, wherein the at least one processing device is further configured to:

electronically receive, from a computing device of a user, a request to establish a transmission link between the CHVD and the HVD;

electronically receive, from the computing device of the user, one or more authentication credentials associated with the user;

validate the one or more authentication credentials associated with the user; and establish the transmission link between the CHVD and the HVD.

7. A computer program product for decentralized edge computing enablement in robotic process automation, the computer program product comprising a non-transitory computer-readable medium comprising code causing a first apparatus to:

electronically receive an indication that a hosted virtual desktop (HVD) has received a first set of instructions for execution from a controller hosted virtual desktop (CHVD), wherein the first set of instructions is associated with a first task;

initiate an edge computing enablement engine on the HVD in response to receiving the indication that that HVD has received the first set of instructions, wherein initiating further comprises severing a communication link between the HVD and the CHVD to remove a dependency of the HVD on the CHVD and use the edge computing enablement engine to manage the execution of the task;

electronically receive, from the HVD, an indication that the first set of instructions have been executed by the HVD;

predict, using the edge computing enablement engine, a second task to be executed by the HVD;

initiate a quantum database search algorithm on a knowledge repository, wherein the knowledge repository comprises one or more tasks;

determine, using the quantum database search algorithm, a location of the second task in the knowledge repository;

retrieve a second set of instructions associated with the second task from the location of the second task in the knowledge repository;

initiate, using the edge computing enablement engine, an execution of the second set of instructions on the HVD;

electronically receive, from the HVD, an indication that the second set of instructions have been executed by the HVD; and in an instance in which the second task is a final task to be executed by the HVD, re-establish the communication link between the HVD and the CHVD in response to receiving the indication that the second set of instructions have been executed by the HVD.

8. The computer program product of claim 7, wherein the first apparatus is further configured to:
- electronically receive, from the HVD, an indication that the first set of instructions were not successfully executed;
- determine at least one technical issue associated with the execution of the first set of instructions;
- initiate a machine learning model on the at least one technical issue; and
- classify the at least one technical issue into at least one class.

9. The computer program product of claim 8, wherein the first apparatus is further configured to:
- determine one or more actions associated with the at least one class;
- initiate, using the edge computing enablement engine, an execution of the one or more actions on the HVD;
- electronically receive, from the HVD, an indication that the one or more actions have been executed by the HVD; and
- electronically receive, from the HVD, an indication that the first set of instructions are successfully execute based on at least the execution of the one or more actions.

10. The computer program product of claim 7, wherein the first apparatus is further configured to:
- predict, using the edge computing enablement engine, the second task to be executed by the HVD, wherein predicting further comprises:
  - initiating a sequence prediction algorithm on one or more past tasks executed by the HVD;
  - training a prediction model based on at least initiating the sequence prediction algorithm on the one or more past tasks; and
  - predicting, using the prediction model, the second task to be executed by the HVD.

11. The computer program product of claim 7, wherein the first apparatus is further configured to:
- initiate a quantum database search algorithm on a knowledge repository, wherein the quantum database search algorithm comprises at least a Grover's search algorithm.

12. A method for decentralized edge computing enablement in robotic process automation, the method comprising:
- electronically receiving an indication that a hosted virtual desktop (HVD) has received a first set of instructions for execution from a controller hosted virtual desktop (CHVD), wherein the first set of instructions is associated with a first task;
- initiating an edge computing enablement engine on the HVD in response to receiving the indication that that HVD has received the first set of instructions, wherein initiating further comprises severing a communication link between the HVD and the CHVD to remove a dependency of the HVD on the CHVD and use the edge computing enablement engine to manage the execution of the task;
- electronically receiving, from the HVD, an indication that the first set of instructions have been executed by the HVD;
- predicting, using the edge computing enablement engine, a second task to be executed by the HVD;
- initiating a quantum database search algorithm on a knowledge repository, wherein the knowledge repository comprises one or more tasks;
- determining, using the quantum database search algorithm, a location of the second task in the knowledge repository;
- retrieving a second set of instructions associated with the second task from the location of the second task in the knowledge repository;
- initiating, using the edge computing enablement engine, an execution of the second set of instructions on the HVD;
- electronically receiving, from the HVD, an indication that the second set of instructions have been executed by the HVD; and
- in an instance in which the second task is a final task to be executed by the HVD, re-establish the communication link between the HVD and the CHVD in response to receiving the indication that the second set of instructions have been executed by the HVD.

13. The method of claim 12, wherein the method further comprises:
- electronically receiving, from the HVD, an indication that the first set of instructions were not successfully executed;
- determining at least one technical issue associated with the execution of the first set of instructions;
- initiating a machine learning model on the at least one technical issue; and
- classifying the at least one technical issue into at least one class.

14. The method of claim 13, wherein the method further comprises:
- determining one or more actions associated with the at least one class;
- initiating, using the edge computing enablement engine, an execution of the one or more actions on the HVD;
- electronically receiving, from the HVD, an indication that the one or more actions have been executed by the HVD; and
- electronically receiving, from the HVD, an indication that the first set of instructions are successfully execute based on at least the execution of the one or more actions.

15. The method of claim 12, wherein predicting the second task further comprises:
- initiating a sequence prediction algorithm on one or more past tasks executed by the HVD;
- training a sequence prediction model based on at least initiating the sequence prediction algorithm on the one or more past tasks; and
- predicting, using the sequence prediction model, the second task to be executed by the HVD.

16. The method of claim 12, wherein the method further comprises:
- initiating a quantum database search algorithm on a knowledge repository, wherein the quantum database search algorithm comprises at least a Grover's search algorithm.

17. The method of claim 12, wherein the method further comprises:
- electronically receiving, from a computing device of a user, a request to establish a transmission link between the CHVD and the HVD;
- electronically receiving, from the computing device of the user, one or more authentication credentials associated with the user;
- validating the one or more authentication credentials associated with the user; and
- establishing the transmission link between the CHVD and the HVD.

\* \* \* \* \*